April 21, 1953      A. YUHAS      2,635,290
METHOD FOR MAKING ARTIFICIAL EYES
Filed March 2, 1949      2 SHEETS—SHEET 1
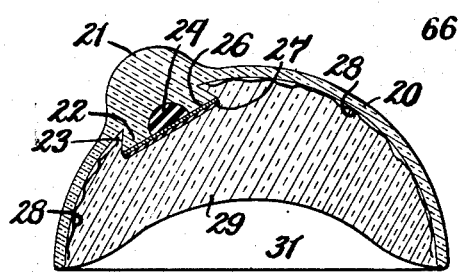
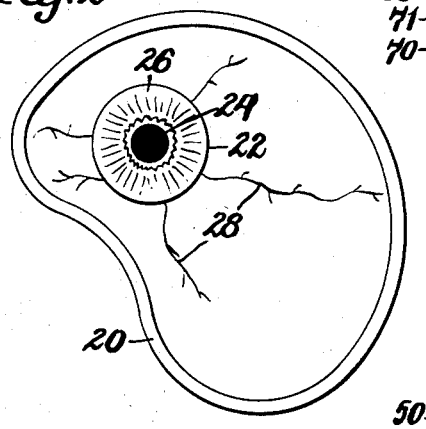
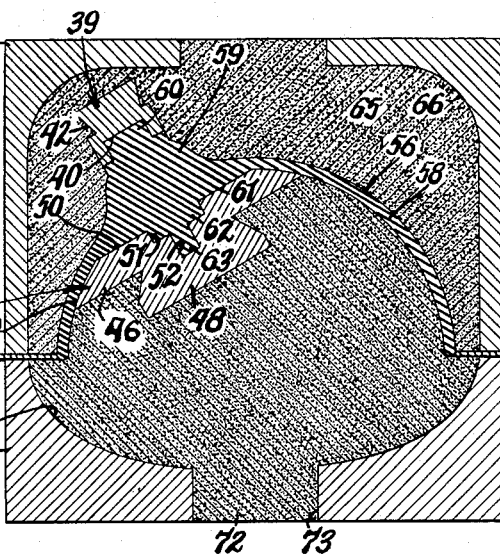
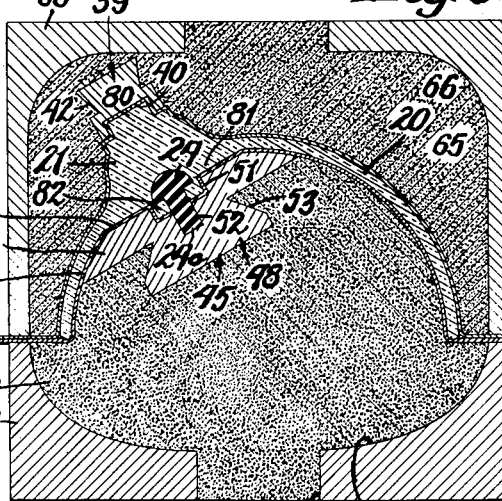
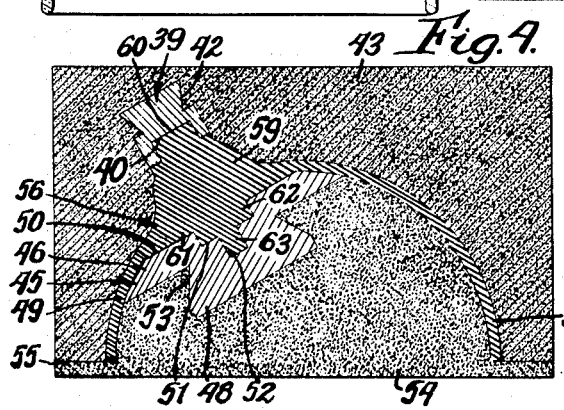
Inventor
Alexander Yuhas
by Popp and Popp
Attorneys.

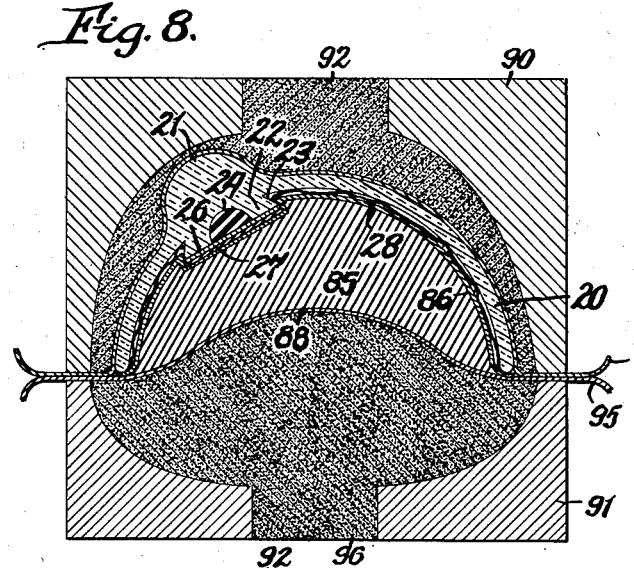
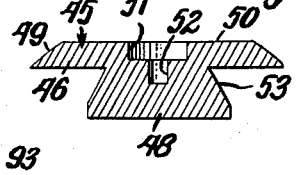
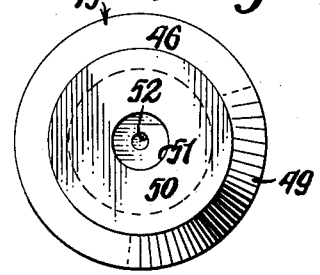
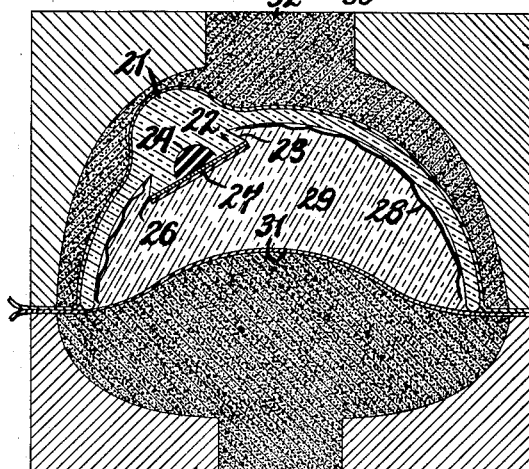
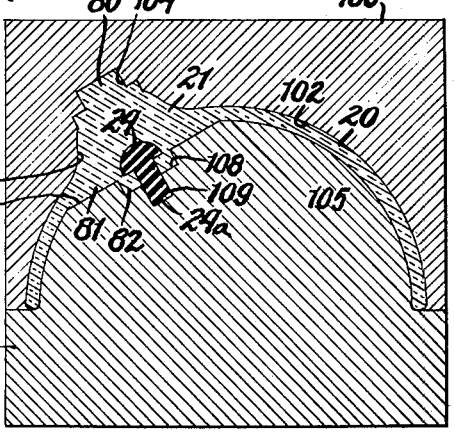
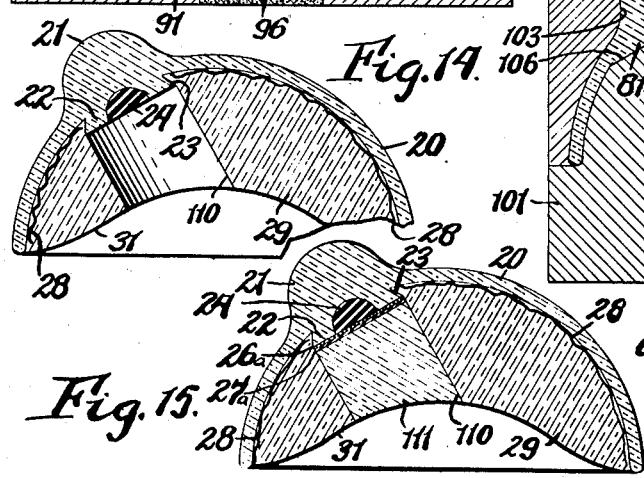
April 21, 1953     A. YUHAS     2,635,290
METHOD FOR MAKING ARTIFICIAL EYES
Filed March 2, 1949     2 SHEETS—SHEET 2
INVENTOR.
Alexander Yuhas
BY Popp and Popp
Attorneys.

Patented Apr. 21, 1953

2,635,290

UNITED STATES PATENT OFFICE 2,635,290

METHOD FOR MAKING ARTIFICIAL EYES

Alexander Yuhas, Buffalo, N. Y.

Application March 2, 1949, Serial No. 79,281

10 Claims. (Cl. 18—47.5)

This invention relates to a method for making an artificial eye, and more particularly an artificial eye which is made principally of synthetic plastic material such as methyl methacrylate.

This application is a continuation in part of my copending application for Artificial Eye, Serial No. 9,540 filed February 19, 1948, now U. S. Patent No. 2,551,781.

In common with my said prior application an important object is to produce an artificial eye which closely resembles the natural eye and which is strong, relatively unbreakable and comparatively low in cost.

Another object is to provide a simplified method for conforming the artificial eye to a companion natural eye in all detail.

A specific object of the present invention is to provide a method of making an artificial eye by which the iris can readily be provided in any desired diameter thereby to permit of matching this iris to the diameter of a companion natural eye at very little cost.

Another object is to provide such a method of making an artificial eye in which the iris so provided in any desired diameter is maintained in centered relation to the pupil and cornea of the artificial eye.

Another object is to produce such an artificial eye in which the color of the iris can readily be changed, the invention including a method of so changing the color of the iris of the artificial eye.

Another object is to produce such an artificial eye which can include the name and address of the owner as well as the trade-mark and name of the maker.

Other objects and advantages of the invention will appear from the following description and drawings in which:

Fig. 1 is a cross section of one form of completed artificial eye made in accordance with the present invention.

Fig. 2 is a rear elevational view thereof prior to placing a fillet or implant therein, the latter fitting the eye to the socket of the patient.

Fig. 3 is a section through the wax model made as the first step in making an artificial eye in accordance with the present invention, this wax model having fitted thereon a metal mold member.

Fig. 4 is a cross section through the two sections of a mold for making a wax pattern from the model shown in Fig. 3 and showing the wax pattern formed therein.

Fig. 5 is a section through a mold or flask used in making an unfinished casting of the shell for the artificial eye from the wax model produced as shown in Fig. 4, this view showing the manner in which it is made from the wax pattern and showing the wax pattern therein.

Fig. 6 is a view similar to Fig. 5 and through the same mold or flask but showing the unfinished casting of the shell substituted for the wax pattern shown in Fig. 5.

Fig. 7 is a cross sectional view of the casting shown in Fig. 6, but showing the same finished by lathe cutting of an iris disk and by grinding or cutting off the lathe centering lugs.

Fig. 8 is a section through a mold or flask used in a further stage of making the artificial eye shown in Fig. 1, this view showing a wax impression or model inserted in the shell of the eye, this wax model being formed as an impression from the eye socket of the patient.

Fig. 9 is a view similar to Fig. 8 and through the same mold or flask but illustrating a further stage of making an artificial eye as shown in Fig. 1, this view showing a plastic fillet or implant substituted for the wax impression or model shown in Fig. 8.

Fig. 10 is a side view of the pupil member of the artificial eye made in accordance with the invention.

Fig. 11 is a section through the metal mold member used in the initial formation of the iris and pupil of the artificial eye made in accordance with the invention.

Fig. 12 is a front view thereof.

Fig. 13 is a view similar to Fig. 6 showing an all metal mold or flask used in lieu of the mold or flask shown in Figs. 5 and 6 to produce the unfinished plastic shell casting of the artificial eye.

Fig. 14 is a view similar to Fig. 1 and showing the implant drilled and the protecting disk for the iris coloring layer removed to expose the rear face of the iris disk and thereby permit of recoloring the iris.

Fig. 15 is a view similar to Fig. 14 showing the iris coloring layer recovered by a protecting disk which can bear the name and address of the owner of the artificial eye as well as the name or trade-mark of the manufacturer, this view also showing the drilled hole of Fig. 14 filled with a clear or transparent plastic to render visible these names, addresses or trade-marks.

Referring more particularly to the artificial eye shown in Fig. 1, the numeral 20 represents the shell or sclera member of the artificial eye, a bottom plan view of this shell or clear member being shown in Fig. 2 and a section in Fig. 7 and this shell being of generally semispherical form and provided on one part of its external or convex surface with a projection or cornea 21 of semiglobular form and on its inner or concave side with an inwardly projecting disk-shaped iris member 22 which is arranged axially in line with the axis of the cornea. This shell, including the cornea and iris, correspond to and simulate the front part of the cornea and the iris members of a natural eye, and are made integrally from a clear or transparent plastic such as methyl methacrylate.

The iris disk 22 is of round form and of substantially the same diameter as the cornea member 21, a feature of the invention residing in cutting this disk to the exact diameter of a companion natural eye. The periphery of this disk is of converging conical form toward the cornea 21 so as to form an undercut circumferential groove 23, the iris disk 22 being thereby of dovetail form in cross section. Embedded axially in this iris disk is an artificial pupil member 24 and which is made of black non-transparent plastic material or the like, this pupil member being shown as being hemispherical and having its flat face flush with the inner side of the iris disk 22.

On its inner surface the iris disk 22 is provided with a design or decoration which is visible from the front side of the cornea and simulates the appearance of a natural iris as to color and design. This simulated iris may be produced photographically or by hand in any desired manner but preferably by suitably painting the same in the form of a coating 26 on the rear or inner side of the iris disk 22.

In order to prevent the pigment or other material 26 used for producing the design effect of an iris on the iris disk from being dissolved and thus rendered indistinct by the solvent in the material which is subsequently placed within the shell 20 to complete the artificial eye, a protecting film 27 is placed over the rear or inner side of the iris coating 26 and thereby prevents the same from being dissolved or smeared and the natural appearance of the artificial eye from being impaired. This protecting film preferably consists of a round wafer of thin sheet rubber secured by a suitable cement to the rear side of the iris disk 22 in back of the design coating 26 thereon.

For the purpose of artificially producing the effect of blood vessels, veins or irregular markings of like character on the shell 20 around the iris in simulation of the human eye a plurality of solvent proof pencil marks or colored threads or fibers 28 are affixed or cemented to the inner side of the shell 20. Where colored threads or fibers are employed they are cemented with a suitable cement and are so arranged that they radiate irregularly from the iris and are visible through the shell from the front or outer side thereof.

Within the shell 20 and covering the inner surface of the same as well as the vessels or veins 28 and the protecting film 27, is a fillet 29 which is molded within the shell 20 to fill the same while the rear concave side 31 of the same is made to conform to the convex front side of the eyeball socket to which the artificial eye is to be applied. This fillet is made of white or tinted opaque plastic which is visible through the shell 20 around the iris disk 22 and presents the appearance and color of the sclera of a natural eye. In molding the fillet 29 in the shell 20 the material of the fillet fills the space within and forms a backing for the inner concave surface of this shell, embedding the veins or vessels 28 as well as the protecting disk 27 for the iris design coating 26. The material forming the fillet 29 also flows around the undercut peripheral groove 23 of the iris disk 22 so as to firmly anchor the fillet 29 in place.

With particular reference to the form of the invention illustrated in Figs. 3–12, the apparatus for producing the artificial eye so described and the several steps of the method which are followed in such production are as follows:

The pupil member 24 of the artificial eye is originally made in the form shown in Figs. 6 and 10, the pupil member there shown comprising the hemispherical body 24 in the form of a head on a stem 24a. This pupil member 24, 24a is preferably made of black plastic or similar material by casting the same in a mold, cutting the same from a rod of this material or in any other suitable manner.

In carrying out the invention shown in Figs. 3–12, the first step involves making the model shown in Fig. 3. The model, indicated generally at 35, is made of wax or the like of such soft consistency that it can be readily sculptured and worked into form. A mass of this wax is placed in the socket of the eye to be fitted and is sculptured to conform to the companion natural eye, and to fit the eye lids and socket. In addition to having its exterior surface 36 rounded in conformity with the natural eye, a cornea 38 is also sculptured to conform to the cornea of the natural eye.

After being so sculptured the model 35 is removed from the eye socket and a metal mold member 39 fitted on the cornea 38 in axial alinement therewith. This metal mold member 39 is of generally cylindrical form and has a cylindrical recess 40 in one end thereof, the rim of the metal mold member 39 being fitted against the cornea 38. This metal mold member can be secured in position by the use of molten wax 41 to seal its rim to the cornea 38 and the opposite end of the metal mold member 39 also preferably has an undercut groove 42 in its periphery so that this end of the metal mold member is of keystone or dovetail form in cross section and will accurately hold itself in position in the hardened plaster or dental stone in connection with which the model as shown in Fig. 3 is used. The purpose of this metal mold member 39 so fitted to the sculptured cornea 38 is to center the iris disk which is subsequently built into the eye.

The model so made is then set into a body 43 of plaster, dental stone or the like, this body being inverted, of course, as compared with the showing in Fig. 4. The body 43 of plaster or dental stone is thereupon permitted to harden so that a negative impression is made of the exterior or convex surface of both the wax model 35 and the metal mold member 39. After the body 43 has so hardened the interior of the model is hollowed out so as to form a semispherical face on the interior of the model 35, and which generally conforms to the exterior face thereof, the hollowed out portion from the model being indicated by the dotted line 44 in Fig. 3. It will therefore be seen that the purpose of making the original wax model 35 is to obtain the proper outer or convex curvature of the face 36 of the artificial eye and the location and shape of the cornea 38, and is not concerned with the concave face of this model in view of the fact that this concave face is scooped out anyhow. Following this, a second metal mold member, indicated generally at 45, is applied to the hollowed out internal face of the model 35. This metal mold member, illustrated in detail in Figs. 11 and 12, comprises a flat metal disk-like head 46 and a circular stem 48, the peripheral portion of the disk-like head 46 being of spherical form, as indicated at 49, to conform to the inner concave face 44 of the model 35 and the end face 50 opposite the stem 48 being of flat circular form and at right angles to the axis of the metal mold member. A cylindrical recess 51 is provided coaxially in the face 50 of the disk-like head 46, the diameter of this recess being equal to the diameter of the recess 40 of the metal mold member 39 and these two recesses being of approximately the same depth. A bore 52 extends coaxially from the bottom of this recess 51, this bore being of a diameter to receive the stem 24a of the hemispherical pupil member 24 and being of such depth as to support the hemispherical head 24 with its flat face approximately coplanar with the outer flat face 50 of the metal mold member 49. The stem 48 of the metal mold member 45 is preferably provided on its periphery with an undercut groove 53 so that this stem is generally of a dovetail or keystone form in cross section.

The metal mold member 45 made as above described is then fitted into the hollowed out interior of the wax model 35 so that its spherical face 49 engages with the hollowed out spherical face 44 of the model and so that it is axially in line with the first metal mold member 39 and cornea 38 of the wax model. Inasmuch as the recess 51 of the inner mold member 45 determines the position of the iris in the finished eye and as this iris must be concentric with the axis of the cornea 38, the importance of having previously applied the cylindrical mold member 39 will be appreciated. Thus this metal mold member 39 was applied with a high degree of exactness externally to the cornea 38 and now serves to locate the inner mold member 45 also in exact alinement with the axis of the cornea. A body of plaster or dental stone 54 is then poured into the hollowed out interior of the wax model 35 and around the metal mold member 45 and over the parting face 55 of the body 43. This plaster or dental stone is thereafter permitted to harden thereby to provide a negative impression of the interior of the hollowed out wax model 35 and to embed the metal mold member 45 therein.

The hardened plaster or dental stone mold sections 43, 54 are then separated and the wax removed therefrom. These two bodies, of course, retain the two metal mold members 39 and 45 embedded therein, this being due to the dovetail grooves 42 and 53 provided in these metal mold members. Where a large number of duplicate eyes are desired, a plurality of wax patterns are prepared from the wax model 35 and to make such a multiplicity of wax patterns, molten wax is poured into the cavity left by the removal of the wax model 35 and the two parts 43 and 54 of the mold brought together so as to force this wax into the metal mold members 39 and 45 and to completely fill the cavity between the mold sections 43 and 54. After this wax hardens it forms a wax pattern, indicated generally at 56. This wax pattern generally conforms to the shell 20, having a semispherical shell 58, a cornea portion 59, a cylindrical centering lug 60 projecting axially outwardly from the cornea portion 59, a mass 61 on its inside opposite the cornea portion 59, a cylindrical lug 62 projecting from the face of the cylindrical mass 61 in centered relation to the lug 60 and a stem 63 projecting axially from the lug 62. This step, used where a plurality of wax patterns are desired in making a large number of duplicate eyes, would not be followed if only one eye were being made for a particular patient and the hollowed out wax model 35 would be used in subsequent processing in lieu of one of the wax patterns 56.

For accuracy, after the wax pattern 56 has been removed from the mold shown in Fig. 4, another metal mold member 39 is fitted against its cornea portion 59 and around the cylindrical lug 60 and another metal mold member 45 is fitted against its inside around its cylindrical lug 62 and stem 63. In so refitting metal mold members 39 and 45 to the wax pattern 56, these metal mold members can be centered with reference to each other if out of line. After being so refitted with the metal mold members 39 and 45, this wax pattern 56 is pressed into a body 65 of plaster or dental stone contained within the cavity 66 of a mold section 68, this plaster or dental stone being in a pliant condition so as to be displaced by the pattern 56. A parting sheet 69 of tissue, foil or the like is then placed over the parting face of the mold section 68 and its companion mold section 70 fitted thereover. The cavity 71 of this second mold section 70 is thereupon filled with a body 72 of plaster or dental stone in a pliant condition through a filling opening 73. After the dental stone or plaster masses 65 and 72 harden, the mold sections 68 and 70 can be separated and the wax pattern 56 removed thereby to leave a cavity corresponding in shape to the wax pattern.

Before reassembling the mold sections 68, 70 the mold cavity of the female mold section 68 is preferably lined with a sheet 75 of tinfoil or the like, this sheet preferably extending along the parting face of the mold section as shown and also over the metal mold member 39. Similarly, the molding and parting face of the male mold section 70 and the metal mold member 45 are also covered with a sheet 76 of tinfoil or the like, the purpose of these sheets being to secure ready separation of the mold sections from the casting and from each other. In addition, the stem 24a of the hemispherical iris member 24 is inserted into the bore 52 of the metal mold member 45, this locating the flat face of this hemispherical iris member 24 approximately in the plane of the outer flat face 50 of the metal mold member 45. The molding material for the shell 20 preferably comprises a clear plastic, such as methyl methacrylate, and a solvent and which are mixed and worked into the form of a readily deformable dough, and which upon being suitably heated will result in a product which is hard and clearly transparent. In making the shell 20 and iris 22 of the artificial eye, a mass of this dough is placed in the cavity of the mold sections 68 and 70 so lined with tinfoil and provided with the black pupil member 24, 24a, and these mold sections closed. When these mold sections are thus closed the plastic dough between the same is squeezed firmly and caused to conform to the contour of the mold cavity thereby to form a casting in which the iris member 24, 24a is partly embedded and which generally conforms to the shape of the shell 20. In practice, somewhat more dough than is necessary to form the casting is placed between the opposite parts of the mold sections and any excess is squeezed out between the parting faces of the mold sections and scraped off as the mold is closed.

After the casting has been thus formed, the mold sections containing the casting are first immersed in water heated to a temperature of 160° F. for a period of one hour and then subjected to boiling water for one-half hour for the purpose of curing and hardening the casting. After the casting has thus been treated it is strong, hard and transparent and the pupil member 24, 24a is securely fastened therein and visible from the convex side of the casting. Upon separating the mold sections 68, 70 the casting is removed, this casting having, in addition to the cornea 21, a lathe centering lug 80 at the outer extremity of the cornea, a mass of plastic 81 within the shell opposite the cornea, a lathe centering lug 82 projecting from the face of the mass 81 and the projecting stem 24a of the iris member 24.

The casting so formed is then placed in a lathe so as to rotate concentric with the axis of the cornea 21 and stem 24a of the pupil member 24, the lathe centering lugs 80 and 82 being used to center the casting on the lathe. The iris 22 is then cut to the desired diameter, this being the diameter of the iris of the natural eye which the artificial eye is to match. So forming the iris 22 is accomplished by a suitable tool introduced into the shell of the unfinished casting to cut the undercut groove 23 into the mass 81 opposite the cornea 21 and thereby produce the iris 22 in the form of a disk which is dovetail in cross section. Since the lathe centering lugs 80 and 82 are coaxial with the corneal 21 and the pupil member 24, 24a, the iris disk 22 so formed is concentric with these parts. Also since the tool is adjusted to cut the iris disk 22 to the exact diameter of the iris of the natural eye, it will be seen that the iris of the artificial eye will be matched to the exact diameter of the iris of the natural eye.

The partly finished casting is then removed from the lathe and the lathe centering lugs 80 and 82, together with the stem 24a of the iris member are ground or cut off, these parts so cut off being represented by dotted lines in Fig. 7. Of course, in removing the outer lathe centering lug 80, the cornea 21 is rounded to conform to a natural cornea. Following this the exterior or convex face of the casting is polished with tripoli or otherwise. After the casting has been so completed and polished the design 26, in simulation of the iris of the companion natural eye is applied to the inner or rear side of the iris disk 22. This iris disk may be produced photographically or by paint, stain or dye or appropriate plastic material to match the color and design of the iris of the patient or individual for whom the artificial eye is intended. In order to prevent this iris design 26 from being dissolved and smeared or rendered indistinct by the solvent of the fillet subsequently placed in the casing, the protecting element 27 is placed over this design. Such protecting element preferably consists of a thin film of rubber cemented to the inner side of the iris disk as shown in Figs. 1, 8 and 9. Imitation blood vessels or veins 28 are then applied to the inner side of the shell around the iris disk 22, which vessels may consist of suitably colored threads, solvent proof pencil marks or the like. When threads are used for this purpose, the same are adhesively held in place on the concave side of the shell by the application of a suitable cement.

In order to fit the artificial eye to the socket of the person for whom it is intended, the concave side of the shell 20 is provided with adapting means which are produced and constructed in accordance with this invention as follows:

The numeral 85 represents a mass of easily deformable wax or the like and which is temporarily placed within the shell 20. In order to protect this wax from adhering to the threads 28 or other parts of the shell 20, a lining 86 of paper or the like is preferably provided within the shell 20 before the wax is placed therein. This separating or lining sheet 86 is subsequently removed with the wax.

After the body 85 of deformable wax has been thus placed in the cavity of the shell, the exposed face of this wax is pressed against the socket of the patient and thereby produces an impression in the wax corresponding to the contour of this socket as shown at 88. This wax is too soft for permanence and is therefore replaced by a plastic duplicate. This wax is therefore replaced by a fillet or implant of plastic or the like material which fillet is shown at 29 in Figs. 1 and 9 for completing the artificial eye preparatory to being used.

This fillet 29 is formed in the shell of the artificial eye as follows:

The numerals 90 and 91 represent the two sections of a finishing mold or flask and are provided on their opposite sides with the usual cavities. To replace the temporary wax model 85 with the permanent plastic fillet 29 of the same form, a quantity of plaster or dental stone 92 in pliable form is placed in the cavity of the mold section 90. With this dental stone in the cavity of this flask section a protecting sheet 93 of thin foil or the like is placed around the convex surface of the shell 20 of the eye and this shell with its foil covering is pressed downwardly into the soft dental stone 92 until the edge or rim of the shell is even with the edge of the flask section 90 around its cavity, at which time any excess dental stone is struck off from the parting face of the flask section and the thin foil smoothed against this parting face. In order to protect the threads 28, a lining 86 of thin paper is preferably provided in the shell 20.

In order to protect the concave side of the shell 20 and its wax body or model 85, a sheet 95 of cellophane is then placed over the concave or impression face 88 of the wax body 85, the edge of the shell 20 and the extending portions of the foil strip 93. The flask section 91 is then inverted and its cavity filled with plaster or dental stone 96 in pliable form introduced as a backing into the cavity of the flask section 91 through the usual filling opening shown. This dental stone 96 fills the cavity of the flask section 91 thereby to obtain a transfer of the impression 88 on the wax 85 to the dental stone 96 in the cavity of the flask section 91. In this manner a replica of this impression is made on the dental stone 96 and the latter becomes a die after it dries out and hardens.

After the dental stone 92 and 96 in the two flask or mold sections 90, 91 has hardened, these flask sections are separated and the wax body 85 is removed from the flask section 90. At the same time the paper lining sheet 86 is also removed from the interior of the shell 20.

A mass of pliable or dough-like plastic is then placed in the interior of the shell 20 and the flask section 91, together with its hardened dental stone backing 96, is placed over the flask section 90 so that the impression of the dental stone 96 is transferred to the dough-like mass of plastic in the shell 20 of the artificial eye. The sheet 95 is used as a separator between the mold halves. The two flask members 90, 91 are now pressed together in mating relation whereby the plastic mass therebetween, while still in a pliable condition, is squeezed between the interior of the shell 20 and the impression surface of the dental stone 96 thereby to form the fillet 29 with an impression of the contour corresponding to the socket of the patient. This pressure in bringing the two flask sections 90 and 91 together also forces the plastic mass into contact with all interior surfaces of the shell 20, particularly into the undercut groove 23 around the iris disk 22 thereof.

The flask is then subjected to a temperature of 160° F. for a period of 1 hour and then boiled in water for ½ hour, this curing and hardening the mass of dough-like plastic and forming it into the fillet 29 of the completed eye.

In Fig. 13 is illustrated a simplified form of carrying out the invention, particularly in forming the unfinished casting for the shell 20 of the eye. As there illustrated, this shell is formed between two metal mold sections 100 and 101, the mold section 100 having a cavity 102 generally conforming to the desired convex face of the unfinished casting of the shell and the mold section 101 having a projection generally conforming to the concave face of the desired unfinished casting of the shell. The mold section 100 is provided with a further cavity 103 corresponding generally to the shape of the cornea 21 of the shell and this cavity terminates in a cylindrical cavity 104 coaxial with the cornea and shaped to provide the cylindrical centering lug 80 on the exterior of the cornea for subsequently mounting the casting in a lathe as previously described. The projection 105 of the mold section 101 is provided with a flat face 106 concentric with and at right angles to the axis of the cornea 21 and this face is provided with a cylindrical recess 108 and a bore 109, both concentric with the axis of the cornea. The cylindrical recess 108 is shaped to conform to the inner centering lug 82 for mounting the unfinished casting in a lathe as previously described, and the bore 109 receives the stem 24a of the pupil member 24.

In the use of the mold as shown in Fig. 13 the stem 24a of the pupil member 24 is placed in the bore 109. A mass of clear plastic, such as methyl methacrylate, is then placed in the cavity of the mold section 100, this having been softened to a dough-like consistency with a solvent. The two mold sections 100 and 101 are then brought together so that the dough-like mass of plastic is pressed between these two mold sections, any excess being forced out past the parting faces of these sections and being scraped away. The mold is then heat treated, first at a temperature of 160° F. for one hour and then at a boiling temperature for one-half hour to cure the plastic which can then be removed as the unfinished casting to be placed upon the lathe and finished in the manner previously described. It will be seen that this form of the invention is particularly adaptable to the formation of stock sizes of artificial eyes, the shell not being formed from a wax model of the natural eye sculptured in the manner described with reference to the form of the invention shown in Figs. 3 through 12. However, such a stock shell as produced from metal molds as shown in Fig. 13 can readily be cut or ground to conform to the natural eye of the patient, methyl methacrylate being readily worked.

A feature of the invention resides in the further adaption of the artificial eye shown in Fig. 1 to changing the color of the iris and to providing the name and address of the owner as well as the trade mark or name of the manufacturer on the eye if desired. To change the color of the iris of the eye as shown in Fig. 1 all that is necessary is to drill a hole 110, as shown in Fig. 14, through the fillet 29 concentric with the axis of the cornea 21 so as to expose the protecting disk 27 for the layer 26 of coloring on the rear face of the iris disk 22. This protecting layer or disk 27 can then be removed and the layer of coloring material 26 scraped off. The layer of coloring material 26 can then be replaced as a layer 26a with the changes in coloring or design required and following this another protecting disk 26a can be substituted for the original protecting disk 27. This protecting disk 27a can bear the name and address of the owner of the eye and can also bear the trade mark or name of the maker of the eye, such being suitably printed on the rear face of this disk. To render visible these names, addresses, or trade marks, the bore 110 can then be refilled with clear plastic 111 as shown in Fig. 15. In this manner the disk 27a serves the double function of protecting the layer 26 of coloring material as well as carrying the name and address of the owner or the trade mark or name of the manufacturer.

From the foregoing it will be seen that the present invention produces an artificial eye which can be made at low cost and which is strong and relatively unbreakable and which is readily matched to a companion natural eye, particularly in obtaining the desired diameter of the iris without modification of the casting process. It will further be seen that the color of the iris can be readily changed or the name and address of the owner or trade mark or name of the maker visibly provided within the eye itself.

I claim:

1. The herein described method of making an artificial eye having a semispherical hollow shell, an iris disk on the inner side of said shell, and a fillet arranged within the shell with its front part interlocked with said iris disk and having its rear side conforming to the patient's eye socket, said method comprising forming said shell and iris disk, placing a mass of impression material in said shell, taking an impression of the patient's eye socket in said mass of impression material while arranged within said shell to produce a model, casting a mold to reproduce the configuration of the rear side of said model while in said shell, removing said model, and casting said fillet in the cavity left by the removal of said model.

2. The herein described method of making an artificial eye having a semispherical hollow shell, an iris disk on the inner side of said shell, and a fillet arranged within the shell with its front part interlocked with said iris disk and having its rear side conforming to the patient's eye socket, said method comprising forming said shell and iris disk, taking an impression of the patient's eye socket in a mass of impression material while temporarily placed within said shell to produce a model, casting a mold to reproduce the configuration of the rear side of said model while in said shell, removing said model, and casting said fillet in the cavity left by the removal of said model.

3. The herein described method of making an artificial eye having a semispherical hollow shell, an iris disk on the inner side of said shell, and a fillet arranged within the shell with its front part interlocked with said iris disk and having its rear side conforming to the patient's eye socket, said method comprising casting said shell and forming said iris disk integrally therewith, taking an impression of the patient's eye socket in a mass of impression material while temporarily placed within said shell to produce a model, casting a mold to reproduce the configuration of the rear side of said model while in said shell, removing said model, and casting said fillet in the cavity left by the removal of said model.

4. The herein described method of making an artificial eye having a transparent semispherical shell provided on its front side with a cornea and on its rear side with an iris disk alining with said cornea, a pupil member embedded in said disk and a fillet within said shell and having its rear side conforming to the patient's eye socket, said method comprising casting said shell, cornea and iris disk as an integral casting and embedding said pupil member in said iris disk as a part of the casting operation, placing a mass of impression material in said shell, taking an impression of the patient's eye socket in said mass of impression material while arranged within said shell to produce a model, casting a mold to reproduce the configuration of the rear side of said model while in said shell, removing said model, and casting said fillet in the cavity left by the removal of said model.

5. The herein described method of making an artificial eye having a transparent semispherical shell provided on its front side with a cornea and on its rear side with an iris disk alining with said cornea, a pupil member embedded in said disk and a fillet within said shell and having its rear side conforming to the patient's eye socket, said method comprising casting said shell, cornea and iris disk as an integral casting and embedding said pupil member in said iris disk as a part of the casting operation, taking an impression of the patient's eye socket in a mass of impression material while temporarily placed within said shell to produce a model, casting a mold to reproduce the configuration of the rear side of said model while in said shell, removing said model, and casting said fillet in the cavity left by the removal of said model.

6. The herein described method of making an artificial eye having a transparent semispherical shell provided on its front side with a cornea and on its rear side with an iris disk alining with said cornea, a pupil member embedded in said disk and a fillet within said shell and having its rear side conforming to the patient's eye socket, said method comprising forming a wax pattern generally conforming to said shell, cornea and iris disk, casting a mold from said wax pattern, removing said wax pattern, placing said pupil member in said mold to project into the iris disk part of the cavity therein, casting said shell, cornea and iris disk in said cavity, placing a mass of impression material in said shell, taking an impression of the patient's eye socket in said mass of impression material while arranged within said shell to produce a model, casting a mold to reproduce the configuration of the rear side of said model while in said shell, removing said model, and casting said fillet in the cavity left by the removal of said model.

7. The herein described method of making an artificial eye having a transparent semispherical shell provided on its front side with a cornea and on its rear side with an iris disk alining with said cornea and a fillet within said shell, which method comprises casting said shell with said cornea and iris disk, casting a part of said fillet in said shell, drilling said part of said fillet generally coaxially with said cornea and iris disk to a diameter and depth to expose the rear face of said iris disk, applying an iris design to said rear face of said iris disk, and refilling the hole in said fillet produced by said drilling and completing the casting of said fillet in said shell to conform to the eye socket of the patient.

8. The herein described method of making an artificial eye having a transparent semispherical shell provided on its front side with a cornea and on its rear side with an iris disk alining with said cornea and a fillet within said shell, which method comprises casting a part of said shell with said cornea and iris disk, casting said fillet in said shell, drilling said part of said fillet generally coaxially with said cornea and iris disk to a diameter and depth to expose the rear face of said iris disk, applying an iris design to said rear face of said iris disk, and refilling the hole in said fillet produced by said drilling with a clearly transparent plastic and completing, with said clearly transparent plastic, the casting of said fillet in said shell to conform to the eye of the patient.

9. The herein described method of making an artificial eye having a transparent semispherical shell provided on its front side with a cornea and on its rear side with an iris disk alining with said cornea and a fillet within said shell, which method comprises casting a part of said shell with said cornea and iris disk, casting said fillet in said shell, drilling said part of said fillet generally coaxially with said cornea and iris disk to a diameter and depth to expose the rear face of said iris disk, applying an iris design to said rear face of said iris disk, applying a protective member to the rear side of said iris design and bearing indicia on its rear side, and refilling the hole in said fillet produced by said drilling with a clearly transparent plastic to render visible said indicia in the finished artificial eye and completing, with said clearly transparent plastic, the casting of said fillet in said shell to conform to the eye of the patient.

10. The herein described method of altering the coloring of the iris of an artificial eye having a transparent semispherical shell provided on its front side with a cornea and on its rear side with an iris disk provided on its rear face with a colored iris design, and a fillet within said shell, which method comprises drilling said fillet generally coaxially with said cornea and iris disk to a diameter and depth to expose the colored rear face of said iris disk, removing said colored iris design and replacing it with a new colored iris design, and refilling the hole in said fillet produced by said drilling with a hard setting plastic.

ALEXANDER YUHAS.

References Cited in the file of this patent

UNITED STATES PATENTS

| Number | Name | Date |
|---|---|---|
| 2,129,304 | Feinbloom | Sept. 6, 1938 |
| 2,394,400 | Noles | Feb. 5, 1946 |
| 2,433,261 | Brent | Dec. 23, 1947 |

OTHER REFERENCES

"The Military Surgeon," Eye Replacement by Acrylic Maxillofacial Prosthesis, Lt. Commander Phelps J. Murphey, June 1945, vol. 96, pages 469–478.